C. PETERSON.
ABSORBER FOR USE IN THE STEMS OF TOBACCO PIPES.
APPLICATION FILED JULY 13, 1910.
1,056,359. Patented Mar. 18, 1913.
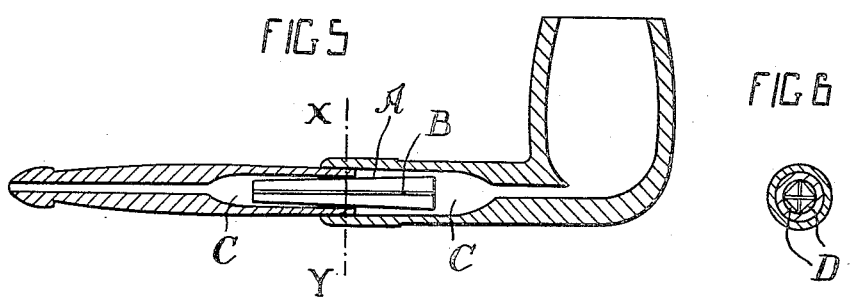
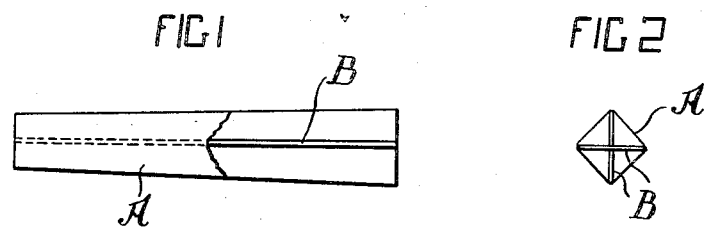
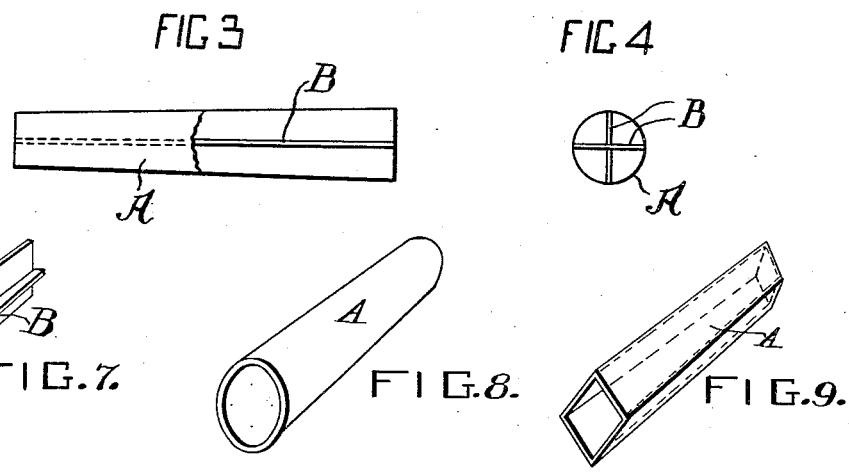

UNITED STATES PATENT OFFICE.

CHARLES PETERSON, OF DUBLIN, IRELAND.

ABSORBER FOR USE IN THE STEMS OF TOBACCO-PIPES.

1,056,359.  Specification of Letters Patent.  Patented Mar. 18, 1913.

Application filed July 13, 1910. Serial No. 571,692.

*To all whom it may concern:*

Be it known that I, CHARLES PETERSON, a subject of the King of Great Britain, residing at Dublin, Ireland, have invented a new and useful Improved Absorber for Use in the Stems of Tobacco-Pipes, of which the following is a specification.

This invention has reference to an improved absorber for use in the stems of tobacco pipes to absorb moisture and prevent its reaching the smoker's mouth.

My improved absorber has the advantages firstly that it obstructs the passage of the smoke to a very small extent and secondly it is not liable to collapse after becoming saturated defects which are inherent in the so-called "cartridges" heretofore in use. Further advantages hereinafter referred to may also be attained by my invention.

My improved absorber is made of comparatively thin absorbent material—for example a pure absorbent paper—made in the form of a tube of suitable diameter and length and having interior supporting stays or ribs also made of absorbent material which latter serve to prevent the thin tube collapsing to an extent to close up the passage for the smoke.

My improved absorber is preferably made with a tapering tube whereby it will be adapted to fit pipes in which the bore or chamber (in which devices of this nature are applied) is smaller or larger than say the normal and a more complete absorption of the moisture contained in the smoke is likely to be attained than when a cylindrical tube is used. Further my improved absorber is preferably made of a tube having a square or other angular sectional or "end on" shape as by this means passages for the smoke will be provided not only through the inside of the tube but also on the—say four—outer sides.

In the accompanying drawing I have illustrated two preferable forms of my invention Figures 1 and 2 showing a square and tapering form and Figs. 3 and 4 a round and tapering form. Fig. 5 is a sectional side elevation and Fig. 6 a cross section on a line X Y Fig. 5 of the stem of a tobacco pipe having the absorber illustrated in Figs. 1 and 2. Fig. 7 is a perspective view of the frame which supports the tube, and Figs. 8 and 9 show respectively like views of a cylindrical and a rectangular tube.

In said drawings A is a tube made of suitable absorbent material—for example a pure absorbent paper—which tube may be of square or round sectional shape as shown respectively in Figs. 2 and 4. Within the tube I provide stays or supports B running the whole length of the tube—which stays are also made of suitable absorbent material—and serve to prevent the tube A collapsing when saturated or during handling and applying my invention to a pipe. The tube A is preferably made taper—the stays B being of course also made taper to a corresponding extent—so that it may fit—within reasonable limits—any size of chamber or bore C of a pipe stem as will be readily understood by reference to Fig. 5. If a square absorber be employed—see Fig. 6—smoke can pass not only through the tube A but also along the spaces D outside thereof and within the chamber C.

I wish it to be understood that I do not confine myself to any particular shape of tube, and, further that the term tobacco pipe may be read to include cigar and cigarette holders.

The stays B not only serve to stiffen the tube A and support it against collapse, but they also greatly increase the area of the absorbing surface, as will be apparent, and this practically doubling of the absorbing surface is secured without interfering with the free passage of the smoke longitudinally of the tube. The stays divide the interior of the tube into a plurality of compartments or passage-ways, open from end to end, through each of which the smoke passes freely, but giving up its moisture on the way.

What I claim as my invention and desire to secure by Letters Patent is:—

1. An absorber for use in the stems of tobacco pipes, consisting of a tube of a comparatively thin absorbent material, open from end to end, and a comparatively rigid frame of absorbent material within and extending the length of the tube and providing a transverse support to prevent collapse of the tube, said frame presenting a large moisture absorbing surface while leaving free passage for the smoke through the tube.

2. An absorber for use in the stems of tobacco pipes, consisting of a tube of comparatively thin absorbent material, open from end to end, and a plurality of elongated flat and transverse supports or stays intersecting each other within and extending the length of the tube, and made of absorbent material, forming a comparatively rigid supporting frame for the tube and dividing it into a plurality of longitudinal compartments, thereby increasing the area of the absorbing surface while leaving the passage of the smoke unimpeded.

3. An absorber for use in the stems of tobacco pipes, consisting of a tapering tube of comparatively thin absorbent material, open from end to end, and a frame of absorbent material within the tube and having a series of radial members extending the length of the tube and from the center thereof to the inner surface of its wall, forming a comparatively rigid transverse support or stay for the tube and increasing the area of the absorbing surface across which the smoke is drawn.

4. An absorber for use in the stems of tobacco pipes, consisting of a tube of comparatively thin absorbent material having flat sides and open from end to end, and a comparatively rigid supporting frame of absorbent material within and extending the length of the tube and dividing the interior thereof into a plurality of longitudinal, uninterrupted smoke passages, the frame supporting the tube against collapse and increasing the area of moisture absorbing surface.

In testimony whereof I have signed my name to this specification in the presence of two subscribing witnesses.

CHARLES PETERSON.

Witnesses:
 ALFRED H. KAPP,
 MICHAEL O. HANLON.